United States Patent [19]

Seeman

[11] 4,333,756
[45] Jun. 8, 1982

[54] METHOD FOR PRODUCING A PRESSED GLASS ARTICLE

[76] Inventor: Thomas A. Seeman, 1152 Juliet, Toledo, Ohio 43614

[21] Appl. No.: 241,491

[22] Filed: Mar. 9, 1981

[51] Int. Cl.³ .................................................. C03B 40/02
[52] U.S. Cl. ............................................. 65/25.1; 65/24; 65/26
[58] Field of Search ........................... 65/25.1, 26, 24

[56] References Cited

U.S. PATENT DOCUMENTS

| | | | |
|---|---|---|---|
| 3,052,629 | 9/1962 | Morrow et al. | 65/24 X |
| 3,094,404 | 6/1963 | Lauck | 65/319 |
| 3,133,807 | 5/1964 | Denman et al. | 65/356 |
| 3,203,777 | 8/1965 | Berry et al. | 65/24 |
| 3,508,893 | 4/1970 | Duggan | 65/24 |
| 3,523,016 | 8/1970 | Mattos | 65/24 X |
| 4,140,512 | 2/1979 | Carmi et al. | 65/319 |
| 4,142,884 | 3/1979 | Jones, Jr. | 65/356 |

FOREIGN PATENT DOCUMENTS 688452  3/1978  U.S.S.R. ............................. 65/25.1

OTHER PUBLICATIONS

Monsanto "Certificate of Quality" for Methyl Acetylene Propadiene, dated: 7/13/77.
Synthatron Corporation data sheet for ethyl acetylene.
Synthatron Corporation data sheet for dimethylacetylene.

Primary Examiner—Arthur D. Kellogg
Attorney, Agent, or Firm—John C. Purdue

[57] ABSTRACT

Improvements in a method for producing a pressed glass article are disclosed. The method includes causing a gas to flow from a manifold around the exterior of a plunger used for pressing a gob of softened glass in a mold; the improvements include the use of a gas which is a cold mixture of at least one alkane and at least one unsaturated hydrocarbon, control of the proportion of alkane to unsaturated hydrocarbon so that a substantially invisible lubricious coating is deposited on the plunger, causing the gas to flow at a sufficiently high rate to cause excessive cooling, and controlling the temperature of the plunger by periodically interrupting the gas flow. The method of the invention provides cooling and lubrication of glass pressing apparatus with a single gas mixture, and helps to alleviate such problems as high expense, inadequate cooling and/or lubrication, pollution and excessive carbonaceous residue which can result from conventional methods.

2 Claims, 4 Drawing Figures

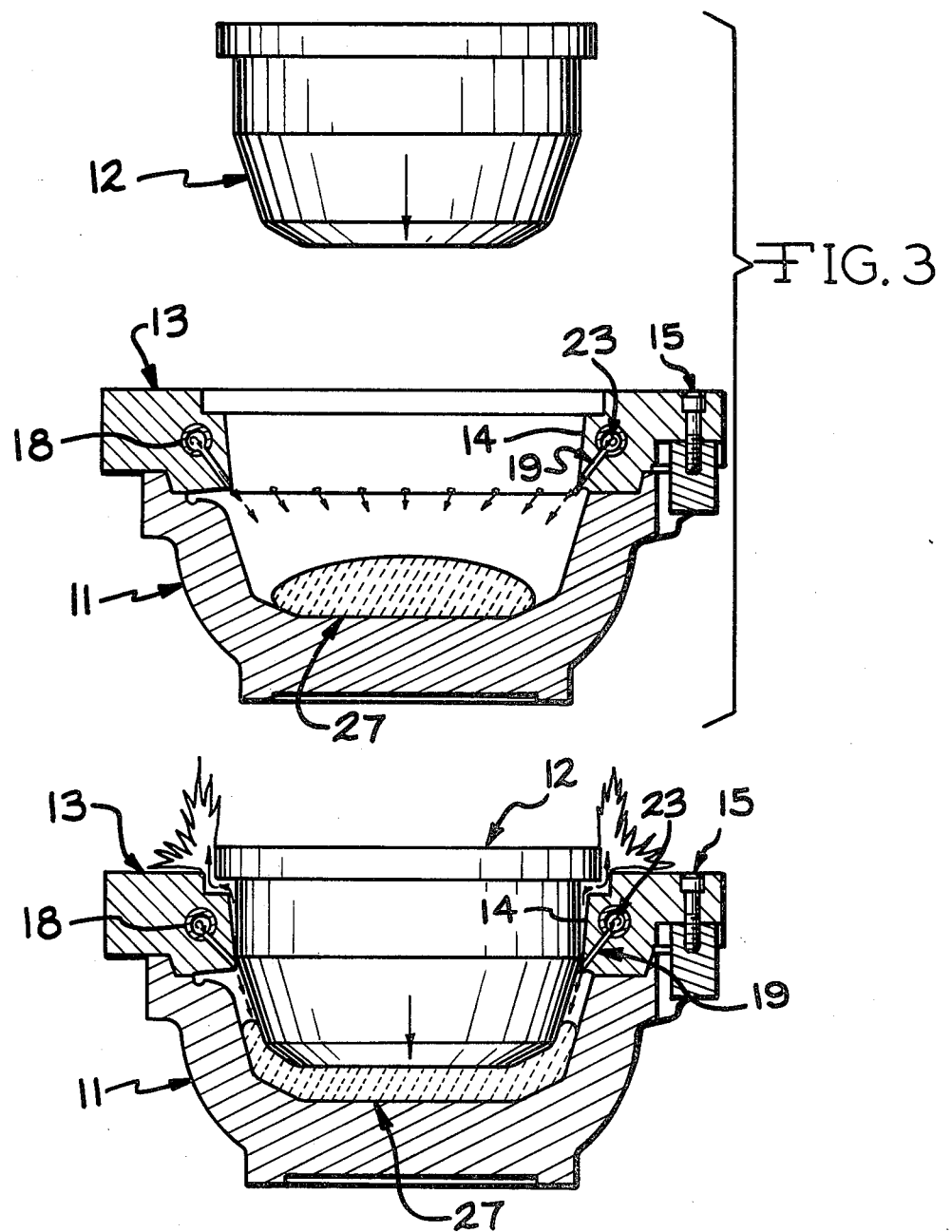

METHOD FOR PRODUCING A PRESSED GLASS ARTICLE

BACKGROUND OF THE INVENTION

1. Field of the Invention

This invention relates to an improvement in a conventional method for producing a pressed glass article, and more particularly relates to the cooling and lubrication of conventional glass pressing apparatus which can be used to produce such an article.

Pressed glass articles, e.g., table ware, lenses, insulators, glass blocks, white ware and crystal ware, are usually made by placing a charge of heat-softened glass, commonly known as a "gob", in a cavity of a mold, and then advancing a plunger, under pressure, into the mold. Modern manufacturing processes, which generally enable large quantities of pressed glass articles of precise dimensions to be produced in a relatively short time, usually employ a plurality of molds. The cavities of the molds are charged with gobs of softened glass from a central reservoir, and the gobs are formed into pressed articles by advancing into the molds plungers driven, for example, hydraulically or by air. Typically, automated pressing operations are used; in such operations several molds are mounted on a circular table and rotated step by step to bring each mold, in turn, below a charging device, then to a pressing station and, after a sufficient interval for cooling, to a station where the pressed articles are removed from the molds.

Particularly in automated glass pressing operations, a major consideration is the control of heat distribution and removal so that surfaces of the pressing apparatus which form the shape of the glass articles, e.g., surfaces of the plunger and the mold cavity, do not become either too hot or too cold. If these surfaces become too hot, sticking of the glass to the mold or plunger may occur; if they become too cold, a crizzling or checking of the glass can result. Overheating can also be detrimental to the proper functioning and longevity of the pressing apparatus, and especially detrimental to metal working surfaces thereof. Expansion of such surfaces can cause, for example, excessive friction and wear as the apparatus is operated. Consequently, during a pressing operation the rate at which excess heat is removed from the pressing apparatus usually limits the rate at which pressed glass articles can be produced from that apparatus.*

*The repeated exposure of the pressing apparatus to molten glass during a pressing operation causes temperatures of parts thereof to rise rapidly; it is thus desirable that the parts be cooled to within acceptable working ranges. If the mold, for examle, is not cooled sufficiently, especially in those localized portions which contact molten glass, it will reach a temperature at which the glass will begin to stick to its interior forming surface, a condition which can necessitate stoppage of the pressing operation for repair of damage. If the temperature of the mold or plunger is not maintained, for example, or is permitted to fall below a predetermined level, wrinkles, checks and other imperfections can result in the finished article. Localized cooling of glass forming surfaces is consequently desirable; it is evident that there is a desirable working temperature range within which the various parts of the pressing apparatus should be maintained, and that the amount of heat which must be removed depends on such factors as, for example, the speed of the pressing operation and the temperature of the molten glass charged to the mold.

It has been found desirable not only to cool surfaces of glass pressing apparatus to prevent overheating, but also to lubricate, for example, the plunger, which contacts the molten glass as it is advanced into the mold to press the article. Proper lubrication helps to prevent adhesion of the glass article thereto when the plunger is subsequently removed from the mold, and can also help to minimize wear of the plunger and other parts of the pressing apparatus.

2. Description of the Prior Art

Various methods have heretofore been used to cool glass pressing apparatus and to lubricate surfaces thereof. A common practice is to remove heat from such apparatus by forcing compressed air, water, natural gas or the like through passages in the mold and/or in a manifold surrounding the exterior of the plunger. However, the use of compressed air for cooling is expensive and also limits production rates because of its low cooling capacity. When water cooling systems are used, including both closed systems, and open, spray-type systems, there is a tendency for an insulating film to form, limiting cooling; an open system causes steam, which is detrimental to both the apparatus and its operator. Furthermore, whether a water system is open or closed, collection of the used cooling water is usually necessary, often resulting in additional expense. A liquefied petroleum gas, for example "natural gas", while ordinarily a satisfactory coolant, and easily disposed of by ignition following use, offers certain disadvantages, as described below.

Lubricants for parts of glass pressing apparatus which contact molten glass or other parts of the apparatus are well known. For example, one practice is to coat a plunger of such apparatus by causing kerosene, light oils, or the like to flow from a manifold or other apparatus around its exterior to deposit a lubricious coating on the plunger during a pressing operation. Lubricants, for example, mixtures of kerosene and light oil, are particularly effective when ignited by contact with molten glass in the mold or by an external spark or pilot light.

While compressed air, water and liquefied petroleum gases can assist in cooling, these substances are not satisfactory for the lubrication of glass pressing apparatus. Desirably, a single application should provide lubrication and remove heat; kerosene, light oil, unsaturated petroleum gases and mixtures of such gases are comparatively undesirable because their ignition often produces unacceptable levels of carbonaceous residue on the mold and glass article, in addition to atmospheric pollution. Liquefied alkanes can be used, and, when ignited, generate less residue and pollution than the aforementioned substances, but do not afford adequate lubrication. The inadequacy of alkanes as lubricants is believed to be attributable to their low carbon contents.

SUMMARY OF THE INVENTION

The instant invention is based upon the discovery of an improvement in a conventional method for producing a pressed glass article such as, for example, a plate or dish of white ware or crystal ware. More specifically, the method which is improved includes the steps of advancing a plunger into a gob of softened glass in a mold while causing a gas to flow from a manifold around the exterior of the plunger. According to the improved method of the invention, the gas which flows from the manifold is a cold mixture of at least one alkane and at least one unsaturated hydrocarbon. The proportion of alkane to unsaturated hydrocarbon in the mixture is controlled so that a substantially invisible lubricious coating is deposited on the plunger. Preferably, the gas mixture is caused to flow at a rate sufficiently high to cause excessive cooling; the plunger temperature is then controlled as desired by periodically interrupting the gas flow.

When pressed glass articles are produced by the improved method of the invention, problems such as damage to the article or to the pressing apparatus caused by excessive heat or uncontrolled cooling are alleviated. Concurrently, problems such as excessive pollution, high cost and inadequate lubrication, all disadvantages of previous attempts at cooling and/or lubrication of glass pressing apparatus, are unexpectedly and advantageously overcome.

Accordingly, it is an object of this invention to provide an improvement in a method for producing a pressed glass article.

It is a further object of this invention to provide improved cooling and lubrication for conventional apparatus used for producing a pressed glass article.

Other objects and advantages of the invention will be apparent from the description which follows, reference being made to the accompanying drawings.

BRIEF DESCRIPTION OF THE DRAWINGS

FIGS. 3 and 4 are views similar to FIG. 2, partially schematic and in partial longitudinal cross section, showing glass pressing apparatus, and illustrating the sequence of operations involved in producing a pressed glass article according to the method of the present invention.

DETAILED DESCRIPTION OF THE INVENTION

Figure 2:
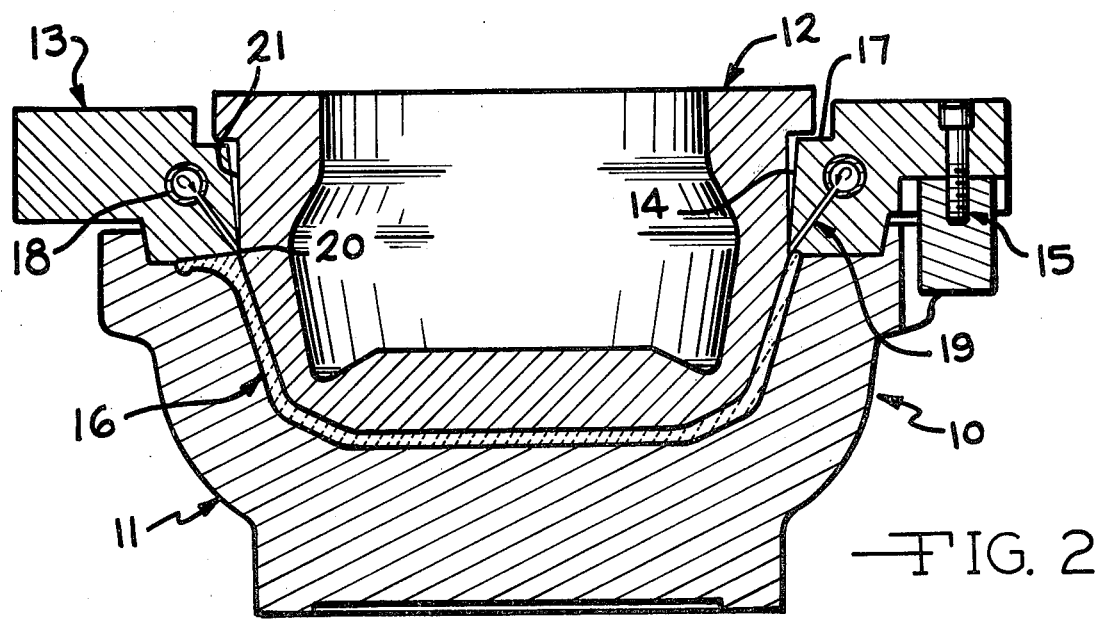
FIG. 2 is a schematic sectional view taken along the line 2—2 of FIG. 1.

Referring in more detail to FIG. 2, largely conventional apparatus for producing a pressed glass article, shown in a fully-closed condition, is indicated generally at 10. The pressing apparatus 10 includes a metal mold 11, a metal plunger 12 and an annular manifold 13 (commonly referred to as a ring assembly). The manifold 13 which, when the apparatus 10 is closed as shown in FIG. 2, surrounds the exterior of the plunger 12, can be made of a stainless steel or a high-nickel steel alloy. An annular, inwardly-tapering surface 14 of the manifold 13 positions the plunger 12 with respect to the mold 11. The manifold 13 is releasably attached to the mold 11 by threaded retainers 15. A fully formed, pressed glass article is indicated at 16, disposed within a mold cavity bounded by forming surfaces of each of the mold 11, the plunger 12 and the manifold 13. A surface 17 of the manifold 13 serves as a stop for the plunger 12.

According to the method of the instant invention, a cooling and lubricating gas is caused to flow, as indicated by arrows, in an annular, cylindrical tube 18 in the manifold 13 of the apparatus 10, and from thence through orifices 19. The orifices 19 extend inwardly and downwardly through the tube 18 and through the manifold 13, terminating at the surface 14 as indicated at 20. The termini 20 of the orifices 19 are immediately adjacent a surface 21 of the fully-advanced plunger 12, so that, in the fully-closed position illustrated (FIG. 2), the plunger 12 acts as a closure for the orifices 19, preventing gas flow therethrough. However, when the apparatus 10 is not fully closed, as shown in FIGS. 3 and 4, gas flows from the manifold 13, through the orifices 19 and onto the surface 21 of the plunger 12 as it is moved into and away from the mold 11 during pressing of the glass article 16. The orifices 19 are spaced around the manifold 13, about 1 inch on centers; they are about 1/20 inch in diameter by 1½ inches in length.

Figure 1:
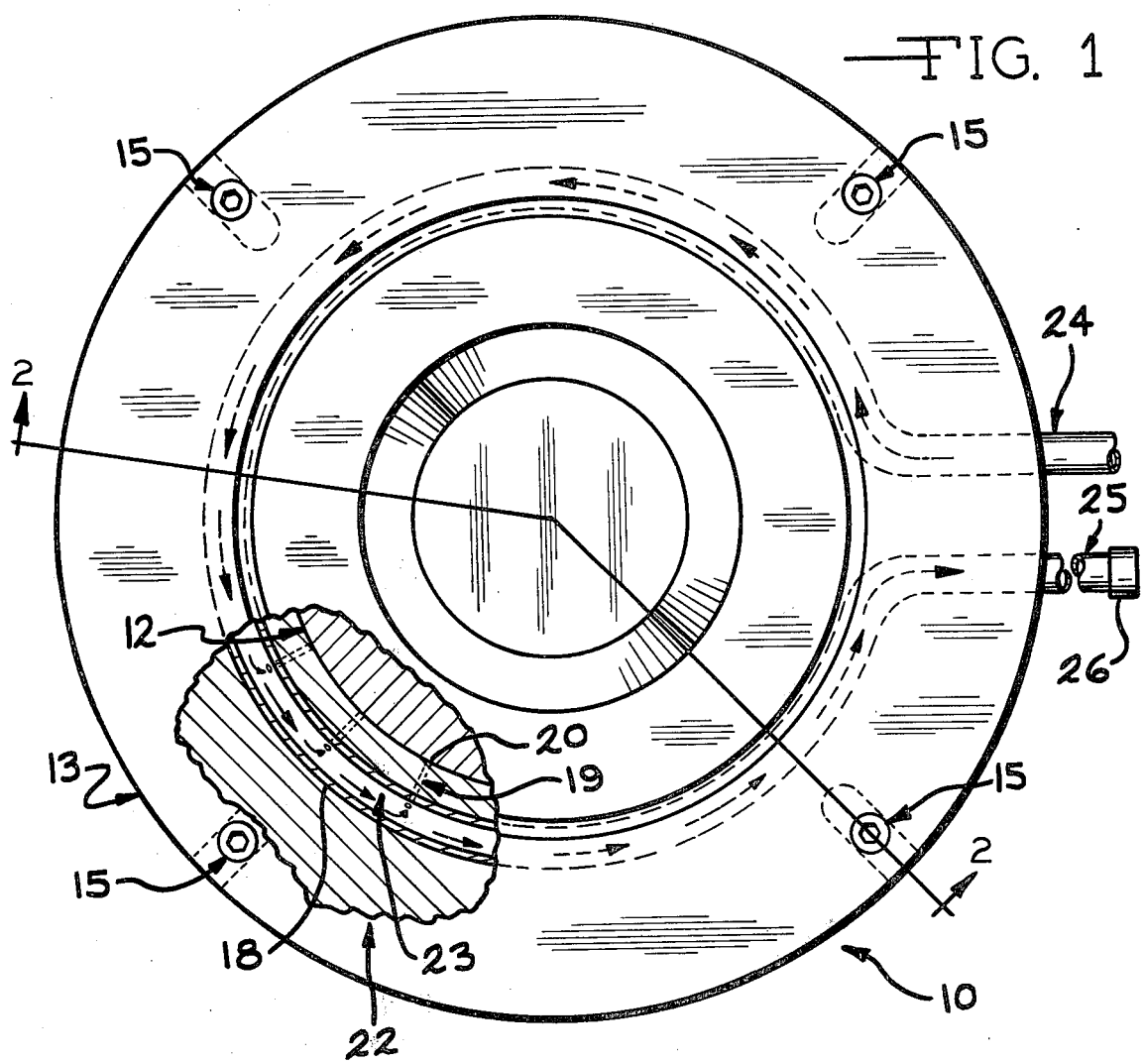
FIG. 1 is a top plan view, partially broken away to show details of construction, of a largely conventional glass pressing apparatus which can be used to produce a pressed glass article according to the improved method of the instant invention.

Referring now in more detail to FIG. 1, a portion of the pressing apparatus 10 is broken away as indicated generally at 22, to show details of construction. The manifold 13 around the exterior of the plunger 12 contains the tube 18. The flow of the cooling and lubricating gas, as indicated by arrows, is in an interior cavity 23 of the tube 18. When the apparatus 10 is operated, a portion of the gas flows from the cavity 23 through the orifices 19 to the termini 20 and therefrom onto the advancing plunger 12. The tube 18 has a projecting, extended inlet portion 24 for receiving gas from a supply source (not shown), and an extended outlet portion 25 which is closed by a releasably engaged cap 26. The cap 26 can be removed, for example to exhaust gas from the cavity 23 during or after a pressing operation.

The improved method of the instant invention for producing a pressed glass article will be more fully understood from the following Example.

EXAMPLE

The largely conventional glass pressing apparatus of FIGS. 1 and 2, was operated to form a gob of softened glass into a pressed glass article. The process illustrated in FIGS. 2, 3, and 4 of the drawings, and described below with reference thereto, was used. The plunger 12, driven by a hydraulic press (not shown), was advanced from the position shown in FIG. 3 into a gob 27 of softened glass, passing through the position shown in FIG. 4, and advancing to the position shown in FIG. 2. As has been described above, the plunger 12 was positioned, as it was advanced, by a surface 14 of the manifold 13. A gas at a temperature of substantially −47 degrees F., and consisting essentially of a mixture of substantially 67 percent by weight methane and substantially 33 percent by weight methyl acetylene propadiene gas*, was charged periodically into the inlet portion 24 of the tube 18. The methyl acetylene propadiene was charged, as a liquid, from a pressurized supply tank (not shown), pressure about 100 psi, into one tube of a conventional venturi mixer (not shown); the methane was charged from a utility supply line (not shown) into the other tube of the venturi. Mixing occurred in a two-way Humphrey valve (not shown) between the venturi tubes and the inlet portion 24 of the tube 18. The Humphrey valve was opened to charge the methane/methyl acetylene propadiene gas mixture into the inlet portion 24 from the point in the cycle when the bottom of the plunger 12 was about 6 inches above the top of the gob 27 until the apparatus was in the fully-closed position shown in FIG. 2: a total time of approximately ½ second. The charging of the saturated/unsaturated gas mixture was then discontinued by closing the valve until the next cycle, a total time of approximately 10 seconds; the cold mixture, after being charged, flowed the length of the tube 18 and from the orifices 19. The flow rate was substantially 2 pounds of the cold mixture per hour.

*The gas used is available from any commercial petrochemical stream under the indicated name. It is a blend of methyl acetylene and propadiene (about 65 mole percent) and other C3 and C4 hydrocarbons (about 35 mole percent), typically containing about 18 mole percent propane, 10 mole percent butanes, 6 mole percent propylene and minor amounts of butadiene and butylenes.

Combustion of some of the gas mixture was observed during the production of pressed glass articles, as described, according to the method of the present invention. Examination of the plunger 12 after such production of glass articles revealed a substantially invisible lubricious coating thereon. The coating was found to be a carbonacous deposit.

The procedure described in the foregoing Example constitutes the best presently contemplated mode for carrying out the instant invention. However, any cold gas mixture can be used in practicing the method of the invention so long as it has the required carbon content.* The mixture preferably includes at least one alkane and at least one unsaturated hydrocarbon, in such proportions to provide a carbon content at which a substantially invisible lubricious coating is deposited on the plunger of the pressing apparatus. To deposit such a coating on a plunger the weight ratio of methane to the foregoing methyl acetylene propadiene gas should be from about 1:1 to 3:1.

*The term "carbon content", as used herein and in the appended claims, refers to a hydrocarbon, and is the total weight of the carbon in a molecule thereof divided by the total weight of the molecule. Thus, the carbon content of methane is 12/16 (0.75); of methyl acetylene 36/40 (0.9). In the case of a blend of gases, the carbon content is the sum of the products of carbon content and weight fraction for each of the gases of the blend.

Formation of a visible deposit has been found to occur when the weight ratio of alkane to unsaturated hydrocarbon in the mixture is lower than about 1:1, while inadequate lubrication has been experienced when this ratio is greater than about 3:1. The carbon contents are 0.813:1, 0.791:1 and 0.782:1, respectively, for the 1:1, the 2:1 and the 3:1 mixtures of methane with the foregoing methly acetylene propadiene gas. It will be appreciated that other mixed gases having corresponding carbon contents can be substituted for those disclosed above, in practicing the instant method, provided that suitable cooling can be accomplished. The foregoing gas mixtures are preferred, however, because vaporization of liquefied methyl acetylene propadiene provides the required temperature without the need for mechanized cooling.

Suitable alkanes which can be used in the cold mixture of the invention include methane, ethane, propane, butanes and mixtures. Suitable unsaturated hydrocarbons include acetylene, methyl acetylene, dimethyl acetylene, ethyl acetylene, propadiene, propylene, butadiene and mixtures. Examples of commercially available mixtures of unsaturated compounds which have been found to be suitable include any of those designated "methyl acetylene propadiene" gas. Although blends of alkanes, including those described above, can be used to produce mixtures useful in the present invention, natural gas, substantially pure methane, is preferred for its comparatively low cost and commerical availability.

As described in the Example, the rate at which the alkane/unsaturated hydrocarbon mixture was charged to the manifold of the pressing apparatus and flowed therefrom was sufficiently high to have caused excessive cooling of the pressing apparatus, if charging of the cold mixture had not been interrupted periodically during the pressing cycle. To avoid excessive cooling in carrying out the method of the invention such interruption can occur when the plunger reaches its fully-advanced position each time the apparatus is operated to press a glass article, or at any other desired point in the pressing cycle, so long as adequate cooling is provided. Charging of the mixture can preferably be resumed during a repeat pressing operation, for example, after the point in the pressing cycle where the plunger has again begun to advance into another gob of molten glass. In the procedure described in the Example periodic interruption of the gas flow provided temperature control, especially of the manifold and plunger, within an acceptable working range for the glass pressing apparatus used; about 600–900 degrees F. An acceptable working range for any particular apparatus can be determined from such factors, for example, as the construction, material and size of the apparatus, the temperature of the glass being pressed, the cycling speed of the apparatus and the temperature of the gas mixture flowing in the manifold. In the method of the invention, periodic interruption of the gas flow can also help to avoid the condition commonly referred to as "press-ups", or excessive friction between the manifold and plunger. A temperature within an acceptable working range usually is also one at which the best quality glass article is produced from that particular apparatus, and in the shortest possible time.

It will be appreciated that, in addition to providing an improved method for cooling and lubricating the largely conventional pressing apparatus described herein, the invention can be applied to advantage to a method for producing glass articles with any suitable type of conventional apparatus. Suitable apparatus can include, for example, a plunger surrounded by a manifold which contains a plurality of tubes or cavities in which a cold saturated/unsaturated gas mixture can circulate, and from which the mixture can flow to provide both cooling and lubrication. In addition, apparatus including a manifold with externally-mounted cooling and lubricating means, comprising tubes and vessels to contain the gas, can be used. Numerous other ways of achieving the advantages of cooling and lubrication according to the invention by applying the improvements thereof to various methods employing many different types of glass pressing apparatus will also be apparent to those skilled in the art.

Various changes and modifications are possible from the specific disclosure hereof without departing from the spirit and scope of the instant invention, and the preceding description is not intended to impose any limitation thereon other than those set forth in the following claims.

What I claim is:

1. In a method for producing a pressed glass article, which method includes the steps of advancing a plunger into a gob of softened glass in a mold while causing a gas to flow from a manifold around the exterior of the plunger, the improvement wherein the gas caused to flow from the manifold is a cold mixture of at least one alkane and at least the unsaturated hydrocarbon and the proportion of alkane to unsaturated hydrocarbon is controlled so that a substantially invisible lubricious coating is deposited on the plunger.

2. In a method as claimed in claim 1, the improvement wherein the gas is caused to flow at a sufficiently high rate to cause excessive cooling, and temperature is controlled by periodically interrupting the gas flow.

* * * * *